United States Patent
Mikawa et al.

(10) Patent No.: US 10,291,899 B2
(45) Date of Patent: May 14, 2019

(54) IMAGE PROCESSING APPARATUS, IMAGE PICKUP APPARATUS, IMAGE PROCESSING METHOD, AND NON-TRANSITORY COMPUTER-READABLE STORAGE MEDIUM FOR GENERATING RESTORED IMAGE

(71) Applicant: CANON KABUSHIKI KAISHA, Tokyo (JP)

(72) Inventors: Takuma Mikawa, Yokohama (JP); Ryota Shoji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 80 days.

(21) Appl. No.: 15/354,141

(22) Filed: Nov. 17, 2016

(65) Prior Publication Data
US 2017/0155881 A1    Jun. 1, 2017

(30) Foreign Application Priority Data

Nov. 30, 2015 (JP) ................................. 2015-232703
Oct. 14, 2016 (JP) ................................. 2016-202186

(51) Int. Cl.
| | | |
|---|---|---|
| *H04N 13/156* | (2018.01) | |
| *H04N 13/106* | (2018.01) | |
| *H04N 5/357* | (2011.01) | |
| *H04N 13/229* | (2018.01) | |

(52) U.S. Cl.
CPC ......... *H04N 13/156* (2018.05); *H04N 5/3572* (2013.01); *H04N 13/106* (2018.05); *H04N 13/229* (2018.05)

(58) Field of Classification Search
CPC ........................... H04N 13/106; H04N 13/156
USPC ........................................................ 348/43
See application file for complete search history.

(56) References Cited

U.S. PATENT DOCUMENTS

| | | | |
|---|---|---|---|
| 5,879,284 A | 3/1999 | Tsujita | |
| 8,416,335 B2 | 4/2013 | Watanabe | |
| 8,593,509 B2 | 11/2013 | Iwasaki | |
| 8,605,163 B2 | 12/2013 | Hatakeyama | |
| 8,749,692 B2 | 6/2014 | Watanabe | |
| 9,424,629 B2 | 8/2016 | Hatakeyama | |
| 2004/0008893 A1* | 1/2004 | Itoi | H04N 19/597 382/236 |
| 2008/0101664 A1* | 5/2008 | Perez | G01C 11/04 382/125 |
| 2012/0163729 A1 | 6/2012 | Mogi et al. | |
| 2013/0162780 A1* | 6/2013 | Kurahashi | H04N 5/3572 348/46 |

(Continued)

FOREIGN PATENT DOCUMENTS

| | | |
|---|---|---|
| JP | 2012-073691 A | 4/2012 |
| JP | 5180407 B2 | 4/2013 |

(Continued)

*Primary Examiner* — Jeffery A Williams
(74) *Attorney, Agent, or Firm* — Venable LLP (57) ABSTRACT

An image processing apparatus (100) includes a synthesizer (101*a*) that synthesizes a first image (image A) with a second image (image B) having a parallax relative to the first image to generate a synthetic image, the first image and the second image being based on outputs of a single image sensor (7), and a filter (101*b*) that performs filtering processing on the synthetic image, the filtering processing being based on a point spread function of an image pickup optical system (1) that is used to generate the first image and the second image.

16 Claims, 5 Drawing Sheets

(56) References Cited

U.S. PATENT DOCUMENTS

2015/0296138 A1   10/2015   Hatakeyama
2017/0155881 A1    6/2017   Mikawa et al.

FOREIGN PATENT DOCUMENTS

JP   2014-150423 A   8/2014
WO   2011/118077 A1  9/2011

* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM FOR GENERATING RESTORED IMAGE

BACKGROUND OF THE INVENTION

Field of the Invention

The present invention relates to an image pickup apparatus and an image processing apparatus which are capable of generating a restored image from a captured image.

Description of the Related Art

A captured image obtained by an image pickup apparatus is deteriorated due to a diffraction phenomenon depending on an aperture value (F number) even when each aberration such as a spherical aberration, a coma aberration, field curvature, and astigmatism is corrected with high accuracy.

Figure 5:
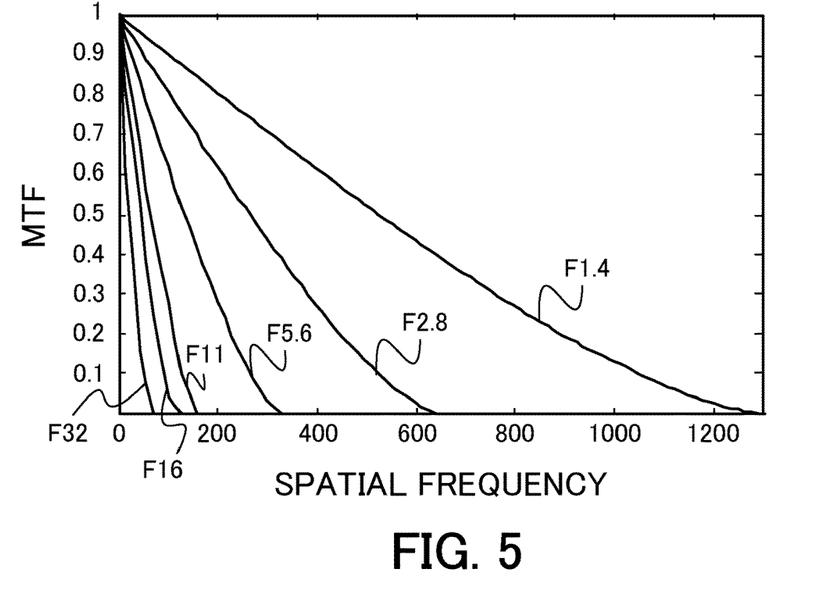
FIG. 5 is an explanatory diagram of a diffraction limit curve.

FIG. 5 is a diffraction limit curve, and the horizontal axis and the vertical axis indicate a spatial frequency and a MTF, respectively. As illustrated in FIG. 5, the darker color the F number indicates, to the lower frequency side the cutoff frequency is shifted. For instance, the Nyquist frequency of an image sensor with a pixel size of 4 μm is 125 lines/mm. Accordingly, when an F number, for example F2.8, indicates a bright color, the degree of adverse effects caused by such a diffraction phenomenon is small. By contrast, when an F number, for example F16 or F32, indicates a dark color, the degree of such adverse effects is large. Since the diffraction phenomenon can be represented by an OTF or a PSF as in the case of the aberration, image restoration processing can correct a blur due to the diffraction.

The presence of a blur component of an image caused by the aberration or diffraction means that when a light beam emitted from one point does not suffer from any aberration or diffraction, the light beam fails to converge to another point, being minutely spread around the another point. Such a minutely-spread distribution is represented by a point spread function (PSF).

An optical transfer function (OTF) obtained by the Fourier transform of the PSF is frequency component information on an aberration and represented by a complex number. An absolute value of the OTF, i.e., an amplitude component, is referred to as a "modulation transfer function" (MTF), and a phase component is referred to as a "phase transfer function" (PTF). The modulation component MTF and the phase component PTF are an amplitude component of image deterioration caused by an aberration, and frequency characteristics of a phase component, respectively, and represented by an expression below with the phase component being defined as a phase angle.

$$PTF = \tan^{-1}(Im(OTF)/Re(OTF))$$

In this expression, symbols Re (OTF) and Im (OTF) represent the real part and the imaginary part of an OTF, respectively. As a method of correcting a deterioration of the amplitude component MTF and the phase component PTF, the correction with the use of information on an OTF of an image pickup optical system is known. This method is typically called image restoration or image reconstruction. Accordingly, processing in which a deteriorated captured image is corrected by using information on the OTF of the image pickup optical system is hereinafter referred to as "image restoration processing". As one of the image restoration methods, the method of convolving an image restoration filter with reverse characteristics of an optical transfer function (OTF) with respect to an input image, which is described below, is known.

The effective use of a restored image requires obtaining more accurate OTF information of the image pickup optical system. For example, the OTF can be obtained by calculation based on design value information of the image pickup optical system. The OTF can be also obtained by capturing a point light source and then performing the Fourier transform on its intensity distribution. Furthermore, for the diffraction, it can be obtained by a theoretically-derived calculation expression.

Japanese Patent Laid-open No. 2012-73691 discloses a method of performing the image restoration processing according to various image capturing conditions of an image pickup apparatus while storing an OTF for use in image restoration which is converted into a coefficient. However, the OTF varies depending on an aperture value, a photographing distance, and a focal length of a zoom lens. Furthermore, the OTF varies depending on a position in an image (image height). Accordingly, entire highly-accurate OTF data has a large amount of data. When the image restoration processing is performed for a single image, the OTF is used while changing depending on the image height and accordingly an amount of calculation is large. The method disclosed in Japanese Patent Laid-open No. 2012-73691 reduces an amount of data by storing an OTF for use in image restoration which is converted into a coefficient. However, further reduction in amounts of data and calculation is required since they affect a calculation speed of an image processing circuit of the image pickup apparatus and a cost for a memory of the image pickup apparatus.

Japanese Patent Laid-open No. 2014-150423 discloses an image pickup apparatus which selects an appropriate image restoration filter depending on an aperture value (F number) when the aperture value is large, and thus it is capable of performing image restoration processing with high accuracy while reducing in amounts of data and calculation.

International Publication No. WO2011/118077 discloses a method of applying an image restoration filter to each of a plurality of parallax images to perform optical correction processing (image restoration processing).

However, in the method disclosed in International Publication No. WO2011/118077, the optical correction processing is performed before the plurality of parallax images are synthesized (i.e., refocus processing is performed), and accordingly it is necessary to perform the optical correction processing on each of the plurality of parallax images. Consequently, the amount of data of the image restoration filter and the amount of calculation of the optical correction processing (image restoration processing) increase.

SUMMARY OF THE INVENTION

The present invention provides an image processing apparatus, an image pickup apparatus, an image processing method, and a non-transitory computer-readable storage medium which are capable of reducing an amount of data of an image restoration filter relating to a plurality of parallax images and an amount of calculation of image restoration processing.

An image processing apparatus as one aspect of the present invention includes a synthesizer that synthesizes a first image with a second image having a parallax relative to the first image to generate a synthetic image, the first image and the second image being based on outputs of a single image sensor, and a filter that performs filtering processing on the synthetic image, the filtering processing being based on a point spread function of an image pickup optical system that is used to generate the first image and the second image.

An image pickup apparatus as another aspect of the present invention includes an image sensor including a plurality of pixels, each pixel including a first photoelectric converter and a second photoelectric converter, and the image processing apparatus.

An image processing method as another aspect of the present invention includes the steps of synthesizing a first image with a second image having a parallax relative to the first image to generate a synthetic image, the first image and the second image being based on outputs of a single image sensor, and performing filtering processing on the synthetic image, the filtering processing being based on a point spread function of an image pickup optical system that is used to generate the first image and the second image.

A non-transitory computer-readable storage medium as another aspect of the present invention stores an image processing program which causes a computer to execute the image processing method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

First of all, a first embodiment of the present invention will be described. In this embodiment, an example of image display application software that operates on a personal computer (PC) as an image processing apparatus will be described.

The application software of this embodiment deals with an image (image data) captured by a camera (image pickup apparatus) which is capable of capturing a plurality of parallax images, and it performs, as image processing, optical correction processing (image restoration processing) and parallax image processing (image synthesis processing). In this embodiment, the image data are not image data in a typical format such as JPEG, and instead they are RAW data output from a sensor (image sensor). In this embodiment, the parallax image processing is refocus processing, and a parameter that is used for the refocus processing is set by a user. The parallax image processing is not limited to the refocus processing, and this embodiment can be applied also to other parallax image processing such as blur correction processing.

Figure 6:
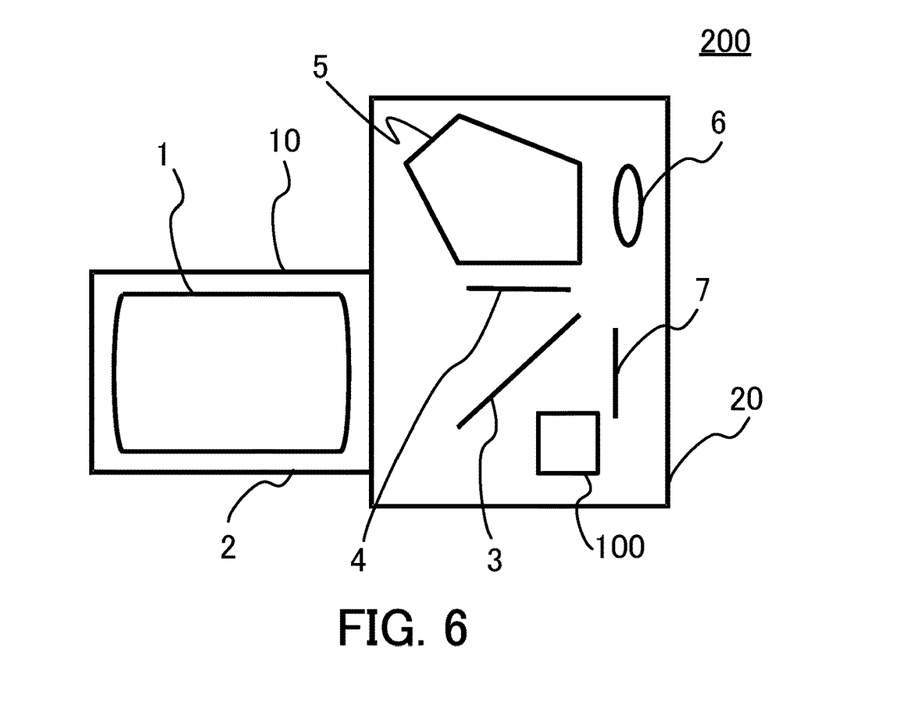
FIG. 6 is a configuration diagram of an image pickup apparatus in each embodiment.

First, referring to FIG. 6, an image pickup apparatus which is capable of capturing a parallax image in this embodiment will be described. FIG. 6 is a configuration diagram of an image pickup apparatus 200 (single-lens reflex camera). The image pickup apparatus 200 is capable of capturing a plurality of parallax images. In FIG. 6, a lens apparatus 10 (interchangeable lens) includes an image pickup optical system 1 (lens unit). The image pickup optical system 1 is held on a lens barrel 2. A camera body 20 (image pickup apparatus body) includes a quick return mirror 3, a focusing screen 4, a penta-dach prism 5, an eyepiece lens 6, and the like. The quick return mirror 3 reflects a light beam formed via the image pickup optical system 1 upwardly. The focusing screen 4 is disposed at an image forming position of the image pickup optical system 1. The penta-dach prism 5 converts an inverse image formed on the focusing screen 4 into an erected image. A user can observe the erected image through the eyepiece lens 6.

An image sensor 7 includes a CCD sensor or a CMOS sensor, and it photoelectrically converts an optical image (object image) formed via the image pickup optical system 1 to output image data. At the time of capturing an image, the quick return mirror 3 is removed from an optical path and an optical image is formed on the image sensor 7 via the image pickup optical system 1. In this embodiment, the image sensor 7 acquires and outputs an image (A+B) (i.e., third image) and an image A (i.e., first image) by a single image capturing operation. A method of generating the image (A+B) and the image A will be described below. By calculation of using the image (A+B) and the image A, the image A (first image) and an image B (second image) can be obtained. A CPU 11 (controller) controls each circuit included in the image pickup apparatus 200, and it performs predetermined image processing on image data generated by the image sensor 7.

The image pickup apparatus 200 includes the camera body 20 including the image sensor 7 and the lens apparatus 10 removably attached to the camera body 20, but this embodiment is not limited thereto. Alternatively, this embodiment may be applied to an image pickup apparatus including a camera body and a lens apparatus integrated with each other, or a mirrorless single-lens reflex camera (mirrorless camera) that is not provided with a quick return mirror.

Figure 3:
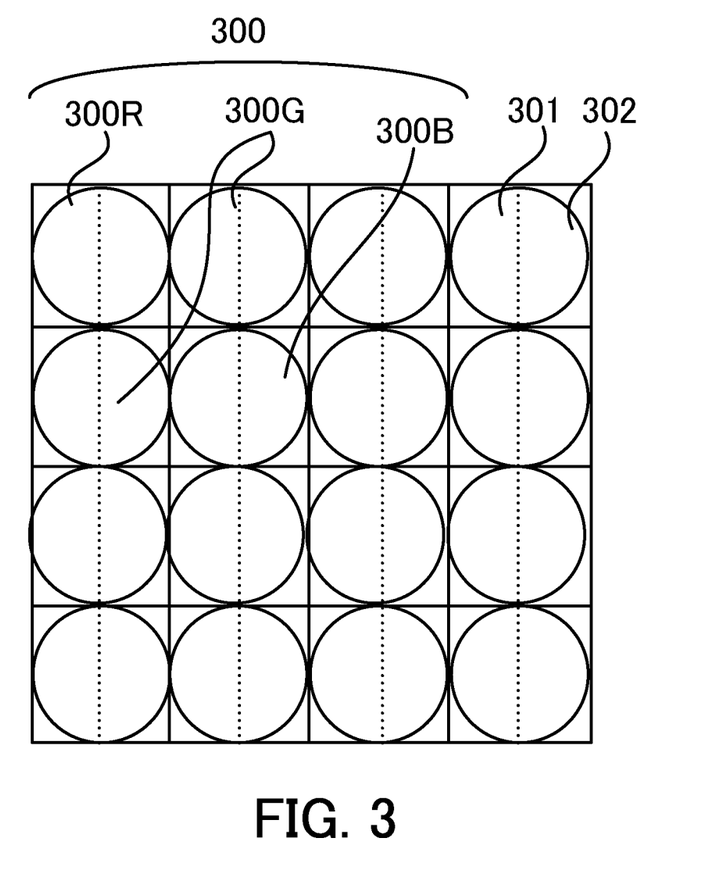
FIG. 3 is a diagram of illustrating a pixel array of an image sensor in each embodiment.

Next, referring to FIG. 3, the image sensor of the image pickup apparatus which is capable of capturing the plurality of parallax images will be described. FIG. 3 is a diagram of illustrating a pixel array of the image sensor, and it illustrates the pixel array of a two-dimensional CMOS sensor (image sensor) in a range of pixels of 4 rows×4 columns and in a range of subpixels of 4 rows×8 columns. A number of pixels of 4 rows×4 columns (subpixels of 4 rows×8 columns) illustrated in FIG. 3 are arranged on an imaging plane, and thus an image (captured image) can be acquired.

A pixel group 300 of 2 rows×2 columns illustrated in FIG. 3 includes pixels 300R, 300G, and 300B. In other words, two pixels 300G having a spectral sensitivity for G (green) at a diagonal position are disposed as pixels at a diagonal position, and a pixel 300R having a spectral sensitivity for R (red) and a pixel 300B having a spectral sensitivity for B (blue) are disposed as the other two pixels. The plurality of pixels are disposed in a predetermined pattern (Bayer pattern). In this embodiment, each of the image A (first image), the image B (second image), and the synthetic image is an image (RAW image) where signals corresponding to a plurality of spectral sensitivities (R, G, and B) are arranged in the predetermined pattern.

Each pixel includes subpixels 301 and 302, and the subpixels 301 and 302 of 1 row×2 columns are arranged in a horizontal direction for each pixel. A subpixel corresponds to a photoelectric converter, and light which is incident on the subpixel 301 (first photoelectric converter) and light which is incident on the subpixel 302 (second photoelectric converter) pass through pupil regions different from each other in an exit pupil of the image pickup optical system 1. In FIG. 3, the plurality of subpixels are arranged only in the horizontal direction, but this embodiment is not limited thereto. Alternatively, a configuration where a plurality of subpixels are arranged only in a vertical direction, or a configuration where a plurality of subpixels are arranged in both of the horizontal direction and the vertical direction to include subpixels of N rows×M columns may be adopted.

In this embodiment, by a single image capturing operation, electric charges accumulated in the subpixel 301 at the left side in each pixel of FIG. 3 are transferred to a floating diffusion (FD) area (not illustrated) to read a signal corresponding to the FD area in each pixel, and thus the image A can be obtained. In other words, the image A is an image based on electric charges accumulated in the subpixel 301 (first photoelectric converter). Subsequently, without resetting the FD area, electric charges accumulated in the subpixel 302 at the right side in each pixel of FIG. 3 are transferred to the FD area to read a signal corresponding to the FD area in each pixel. Accordingly, a signal corresponding to a value obtained by adding (combining) the electric charges accumulated in the subpixel 301 at the left side and the electric charges accumulated in the subpixel 302 at the right side in each pixel can be read out, and it is the image (A+B). Thus, the image A is subtracted from the image (A+B) obtained by the single image capturing operation, and thus the image B corresponding to the electric charges accumulated in the subpixel 302 at the right side in each pixel is obtained. In other words, the image B is an image based on electric charges accumulated in the subpixel 302 (second photoelectric converter).

In this embodiment, the image A that is generated based on an output signal from the subpixel 301 at the left side in each pixel of FIG. 3 is referred to as a parallax image A (first parallax image data) and the image B that is generated based on an output signal from the subpixel 302 at the right side in each pixel of FIG. 3 is referred to as a parallax image B (second parallax image data). In other words, by using the image A, the image (A+B) can be separated into the parallax image A and the parallax image B. Image data of this embodiment include data relating to image capturing information (image capturing condition) and image data including the image (A+B) and the image A recorded after the image capturing information. As long as it is possible to generate both of the parallax image A and the parallax image B, data recorded in a configuration other than that described above may be adopted. Data relating to the image capturing information are data typically recorded in RAW data, and accordingly descriptions thereof are omitted.

Figure 1:
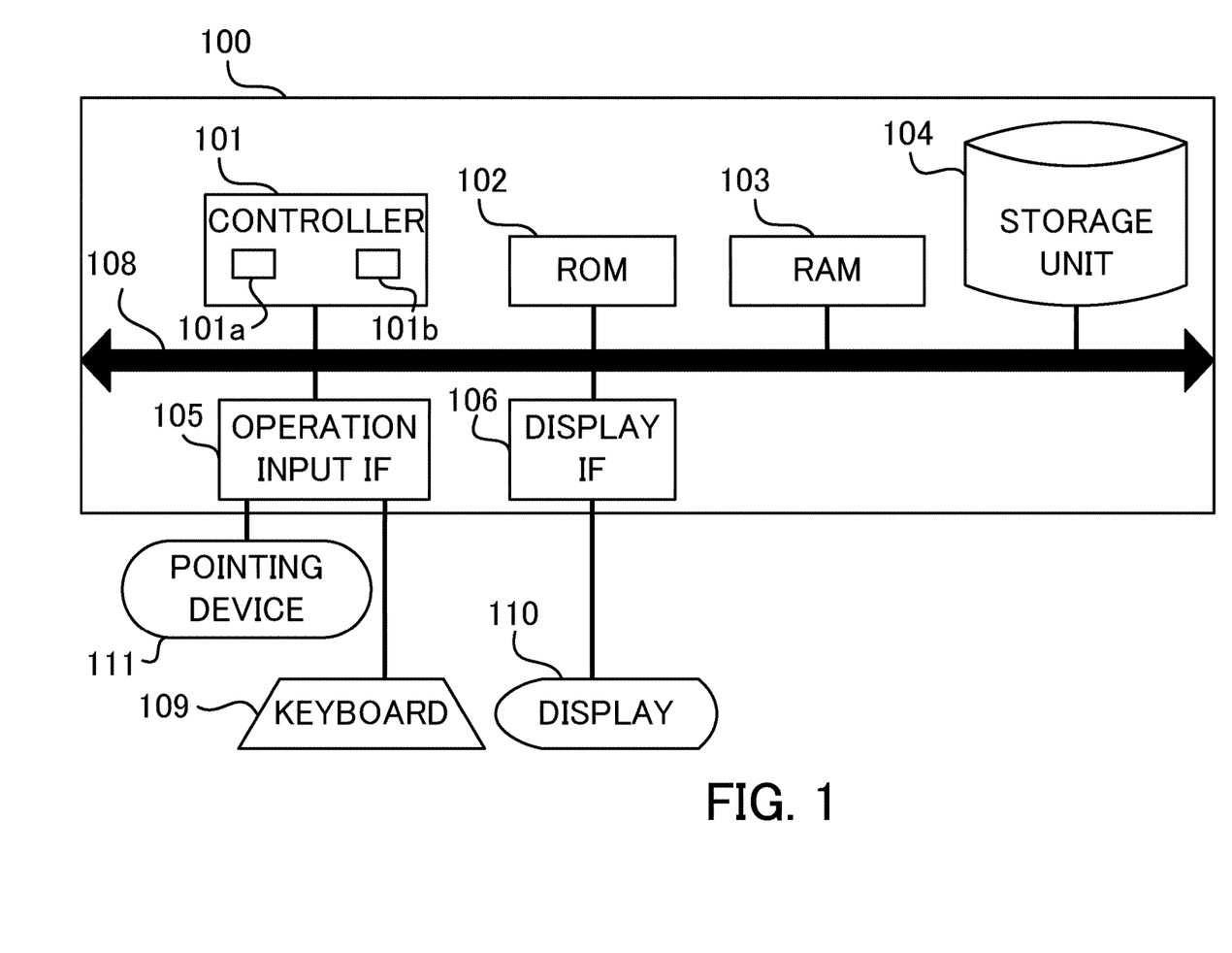
FIG. 1 is a block diagram of an image processing apparatus in each embodiment.

Next, referring to FIG. 1, an image processing apparatus configured by the PC in this embodiment will be described. FIG. 1 is a block diagram of an image processing apparatus 100. In FIG. 1, a controller 101 controls an entire image processing apparatus 100, and it includes for example a CPU (Central Processing Unit). In this embodiment, the controller 101 includes an image synthesis circuit 101a (synthesizer) and an image restoration circuit 101b (filter or image restorer).

The image synthesis circuit 101a synthesizes (combines) a first image (image A) with a second image (image B) having a parallax relative to the first image to generate a synthetic image, and the first image and the second image are based on outputs of the single image sensor 7. The image restoration circuit 101b performs filtering processing on the synthetic image, and the filtering processing is based on a point spread function (PSF) of the image pickup optical system 1 that is used to generate the first image and the second image. In other words, the image restoration circuit 101b performs image restoration processing by applying an image restoration filter to the synthetic image to generate a restored image. Preferably, the image synthesis circuit 101a separates (subtracts) the first image (image A) from a third image (image (A+B)) to generate the second image (image B). As described above, the first image (image A) and the third image (image (A+B)) are generated by a single image capturing operation of the image sensor 7.

A ROM (Read Only Memory) 102 is a memory that stores a program and a parameter which are not unchangeable. The application software is stored in the ROM 102. A RAM (Random Access Memory) 103 is a memory that temporarily stores a program and data provided from an external apparatus or the like.

A storage unit 104 (external storage device) includes a hard disc, a memory (memory card), a Floppy® disk (FD) or an optical disk such as a Compact Disk (CD) that are removable from the image processing apparatus 100, a magnetic card, an optical card, an IC card, or the like. The storage unit 104 can record a program and digital data such as image data captured by the image pickup apparatus (camera). In this embodiment, the storage unit 104 records an image processing program described below as a program code readable by the controller 101 which is capable of executing this program code. The storage unit 104 is a memory that stores data indicating a filter coefficient of the filtering processing described below or data for generating the filter coefficient.

An operation input IF 105 is an interface with an input device such as a keyboard 109 and a pointing device 111 (mouse) for inputting data according to an operation of a user. A display IF 106 is an interface with a display 110 (display apparatus) for displaying data stored or provided in the image processing apparatus 100. A bus 108 is a system bus that communicatively connects each unit of the image processing apparatus 100.

While this embodiment describes an example where the image processing program is stored in the storage unit 104, this embodiment can be applied also to a configuration where the image processing program is stored in the ROM 102 or on the network (location separated from the image processing apparatus 100).

Figure 2:
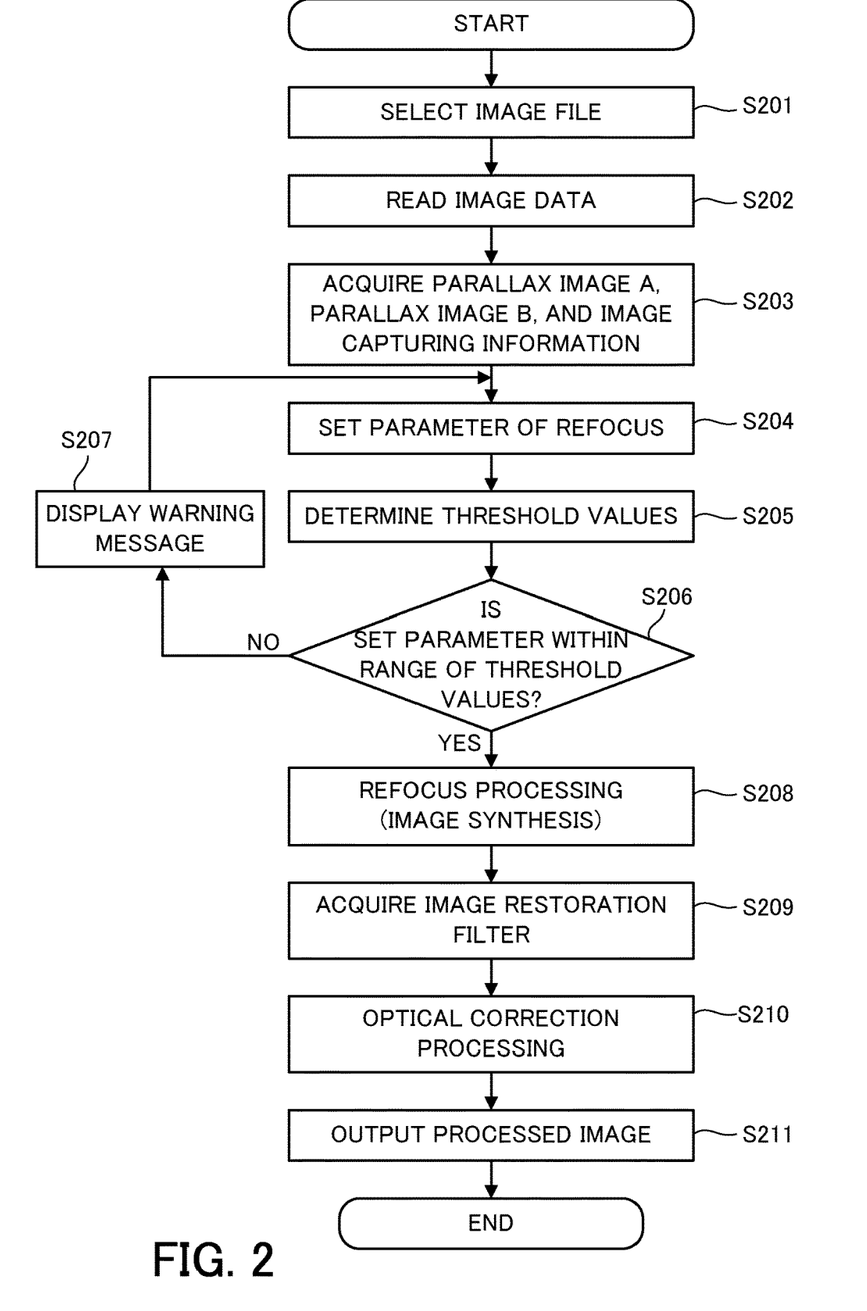
FIG. 2 is a flowchart of illustrating an image processing method in a first embodiment.

Next, referring to FIG. 2, an image processing method (image processing program) in this embodiment will be described. FIG. 2 is a flowchart of illustrating the image processing method (image processing program). Each step in FIG. 2 is performed mainly by the controller 101 of the image processing apparatus 100 according to the image processing program. The image processing apparatus 100 receives image data including the image (A+B) and the image A that are captured by the image pickup apparatus 200 for example via wireless communication, a network, or a non-volatile memory card, and it stores the image data in the storage unit 104 (memory).

First, at step S201, the controller 101 instructs a user to select an image file. In this embodiment, the user selects the image file by using a file selection dialogue of OS standard. The user selects the image file for example from the storage unit 104. Subsequently, at step S202, the controller 101 reads the image data selected by the user, and it stores the read image data for example in the RAM 103.

Subsequently, at step S203, the controller 101 acquires image capturing information (image capturing condition) and stores it in the RAM 103. Furthermore, in this embodiment, the controller 101 acquires the parallax image A and the parallax image B based on the image (A+B) and the image A included in the image data read at step S202, and it stores the parallax images in the RAM 103. The image data read at step S202 are unnecessary after each parallax image and image capturing condition are acquired, and accordingly the controller 101 deletes the image data from the RAM 103.

Subsequently, at step S204, the controller 101 instructs the user to set a parameter (refocus parameter) for refocus processing (parallax image processing or image synthesis processing). In this embodiment, "image shift amount" (a value relating to a relative shift amount between the parallax image A and the parallax image B) that indicates a degree of the shift between the parallax image A and the parallax image B in a horizontal direction for the image synthesis during the refocus processing can be input and set by using a numerical value. For example, when the image shift amount is set to "1", it means that the parallax images A and B are synthesized while shifting the parallax image B by one pixel to the right relative to the parallax image A. When the image shift amount is set to "−2", it means that the parallax images A and B are synthesized while shifting the parallax image B by two pixels to the left relative to the parallax image A. When the image shift amount is set to "0", it means that the parallax images A and B are synthesized without shifting the parallax image B relative to the parallax image A. As described above, a positive integer is set when the parallax image B is shifted to the right relative to the parallax image A, and on the other hand a negative integer is set when the parallax image B is shifted to the left relative to the parallax image A. The image sensor that is used in this embodiment includes subpixels that are arranged only along the horizontal direction, and accordingly it can perform the refocus processing only in the horizontal direction. On the other hand, if an image sensor which includes subpixels arranged along a vertical direction is used, it can perform the refocus processing in the vertical direction.

Subsequently, at step S205, the controller 101 determines threshold values T based on the image capturing information (image capturing condition) of the image data (i.e., the threshold values T vary depending on the image capturing condition). The threshold values T are determined to be able to set the image shift amount only within a range where an impact on an image quality is small. In this embodiment, the threshold values T change depending on an object distance as an image capturing condition in three steps as follows. For example, the threshold values T are determined as T=−2 and 2 when the object distance is less than 10 cm, the threshold values T are determined as T=−3 and 3 when the object distance is not less than 10 cm and is less than 100 cm, and the threshold values T are determined as T=−4 and 4 when the object distance is not less than 100 cm. In this embodiment, however, the threshold values T can be determined based on image capturing information (image capturing condition) other than the object distance. The positive and negative threshold values T are set for each object distance because both directions of the right and left are considered as directions of the image shift amount.

Subsequently, at step S206, the controller 101 determines whether or not the parameter (i.e., the shift amount of a position of the second image relative to the first image) set at step S204 is within the range of the threshold values T determined at step S205. When the set parameter (shift amount) is within the range of the threshold values T (i.e., within the range from the negative threshold value to the positive threshold value), the flow proceeds to step S208. On the other hand, when the set parameter (shift amount) is outside the range of the threshold values T (i.e., greater than the positive threshold value or less than the negative threshold value), the flow proceeds to step S207. At step S207, the controller 101 displays a notice such as a warning message indicating that the set parameter (shift amount) is outside the threshold values T on the display 110. Then, in order to instruct the user to perform the setting of the parameter again, the flow returns to step S204.

Subsequently, at step S208, the controller 101 performs refocus processing on the parallax image A and the parallax image B. The refocus processing is processing (image synthesis processing) of synthesizing the parallax image A with the parallax image B while shifting them by the image shift amount set at step S204 to generate a synthetic image (refocus image). In other words, the image synthesis circuit 101a synthesizes the parallax image A with the parallax image B while a position of the parallax image B (second image) is shifted relative to the parallax image A (first image). In this embodiment, when the image shift amount is a positive value, the parallax image B is shifted to the right relative to the parallax image A. On the other hand, when the image shift amount is a negative value, the parallax image B is shifted to the left relative to the parallax image A.

Subsequently, at step S209, the controller 101 acquires, from the storage unit 104, an image restoration filter that is used for the optical correction processing (image restoration processing). This image restoration filter includes a filter coefficient based on a point spread function (PSF) depending on the image capturing information (image capturing condition). The controller 101 (image restoration circuit 101b) reads, from the memory such as the storage unit 104, data indicating the filter coefficient of the filtering processing or data for generating the filter coefficient. Preferably, the image restoration filter is a filter that corresponds to an image obtained by synthesizing a plurality of parallax images while the image shift amount is "0" (zero), i.e., a filter which is optimally designed to an image obtained by synthesizing the plurality of parallax images while the image shift amount is "0". However, this embodiment is not limited thereto.

Subsequently, at step S210, the controller 101 performs the optical correction processing (image restoration processing) on the synthetic image (refocus image) generated at step S208. The optical correction processing is processing that includes filtering processing by applying the image restoration filter (i.e., using the data, which is read from the memory, relating to the filter coefficient) acquired at step S209 to the refocus image to generate a restored image. When the image shift amount is within the range of the threshold values T determined at step S205, a satisfactory quality image can be obtained as an image (restored image) where the image restoration filter has been applied. Subsequently, at step S211, the controller 101 outputs image data (restored image) where the image processing has been performed. In this embodiment, the controller 101 displays the image data where the image processing has been performed on the display 110, and it converts the image data into the JPEG format to be stored in the storage (memory) such as the storage unit 104.

As described above, the image processing apparatus 100 performs the optical correction processing (image restoration processing) on the image (synthetic image or refocus image) where the parallax image processing such as refocus processing has been performed. In this embodiment, preferably, when the parameter (i.e., the shift amount of the position of the second image relative to the first image) is within the range of the threshold values, the image synthesis circuit 101a generates the synthetic image by using the parallax image A (first parallax image data) and the parallax image B (second parallax image data). Then, the image restoration circuit 101b applies the image restoration filter to the synthetic image to perform the image restoration processing. Accordingly, an amount of data of the image restoration filter and an amount of calculation of the image restoration processing (optical correction processing) can be reduced.

In this embodiment, the parameter (refocus parameter or shift amount) that is used for the refocus processing is set by inputting a numerical value of the parameter, but this embodiment is not limited thereto. For example, a slider may be used to set the numerical value. In this case, in order to easily distinguish between the inside and the outside of the range of the threshold values, a displayed color can be changed between the inside and the outside of the range of the threshold values.

In this embodiment, the threshold values T are determined depending on an object distance as image capturing information, but this embodiment is not limited thereto. For example, the threshold values T can be determined depending on a condition of outputting the restored image data (i.e., depending on an output condition of the restored image) at step S211. For example, when an image quality of the output image decreases with reducing the image or with increasing a compression rate of storing the image in the JPEG format, a width of the threshold values T (i.e. range between the positive and negative threshold values T) can be set to be wider.

While the user needs to set the parameter again when the parameter set by the user is outside the range of the threshold values T, the refocus processing may be performed according to the set parameter. In this case, however, a satisfactory quality image cannot be obtained even when the image restoration filter is applied to the refocus image, and accordingly the image restoration filter is not applied.

Second Embodiment

Next, a second embodiment of the present invention will be described. This embodiment is different from the first embodiment in the processing which is performed when the parameter (refocus parameter) set during the refocus processing is outside the range of the threshold values T. Specifically, in the first embodiment, when the refocus parameter is outside the range of the threshold values T, the user sets the refocus parameter again. On the other hand, in this embodiment, when the refocus parameter is outside the range of the threshold values T, the optical correction processing (image restoration processing) is performed on a plurality of parallax images before the refocus processing (parallax image processing) is performed. The configurations of the image processing apparatus and the image pickup apparatus in this embodiment are the same as those in the first embodiment, and accordingly descriptions thereof are omitted.

Figure 4:
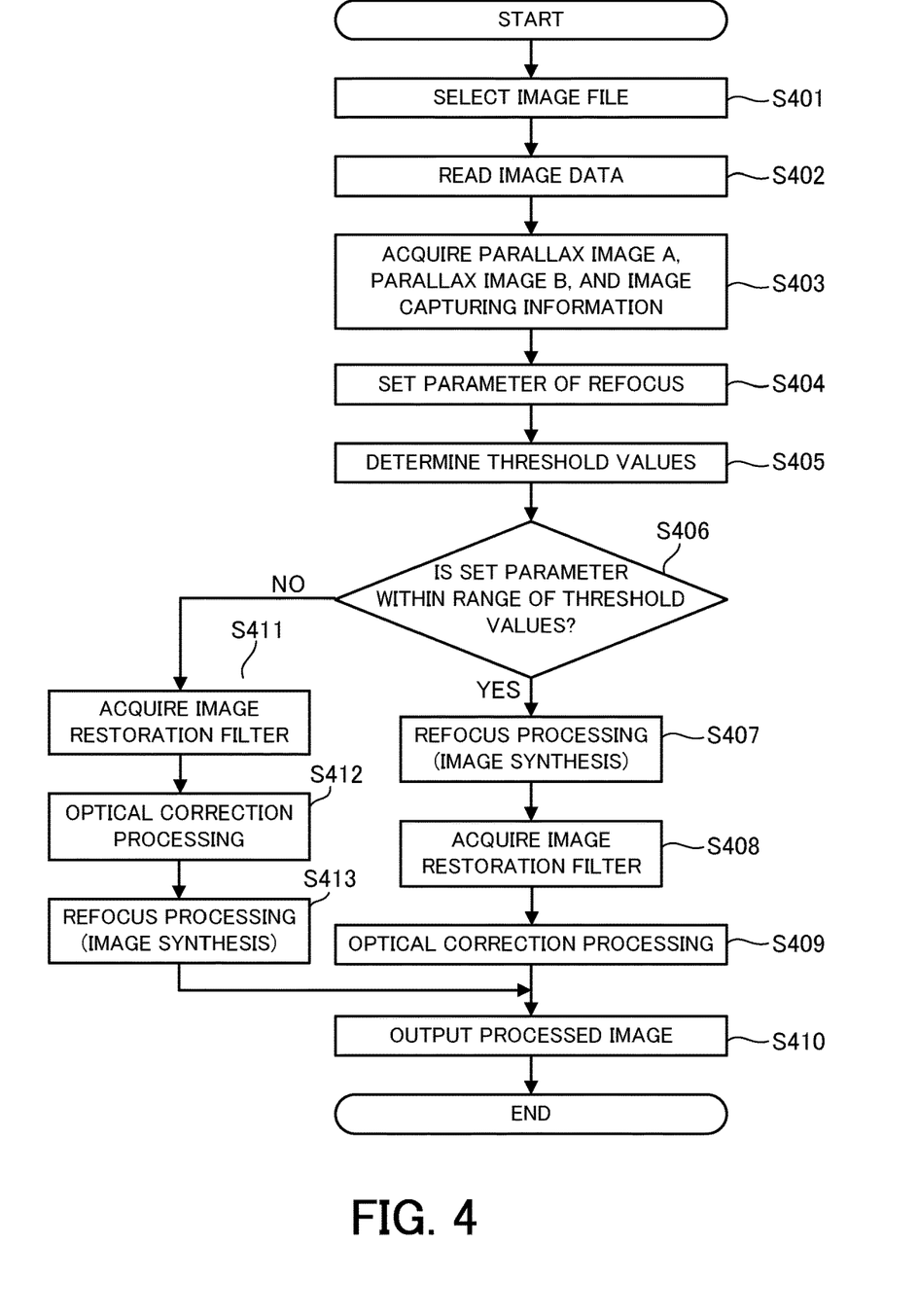
FIG. 4 is a flowchart of illustrating an image processing method in a second embodiment.

Referring to FIG. 4, an image processing method (image processing program) in this embodiment will be described. FIG. 4 is a flowchart of illustrating the image processing method (image processing program). Each step of FIG. 4 is performed mainly by the controller 101 of the image processing apparatus 100 according to the image processing program. In FIG. 4, steps S401 to S405 and S407 to S410 are the same as steps S201 to S205 and S208 to S211 of the first embodiment described referring to FIG. 2, respectively, and accordingly descriptions thereof are omitted.

At step S406, the controller 101 determines whether or not the parameter (refocus parameter or shift amount) set at step S404 is within the range of the threshold values T determined at step S405. When the set parameter is within the range of the threshold values T, the flow proceeds to step S407. On the other hand, when the set parameter (shift amount) is outside the range of the threshold values T, the flow proceeds to step S411.

At step S411, the controller 101 acquires, from the storage unit 104, image restoration filters that are used for the optical correction processing (image restoration processing). These image restoration filters include an image restoration filter (first image restoration filter) which is applied to the parallax image A (first parallax image) and an image restoration filter (second image restoration filter) which is applied to the parallax image B (second parallax image). Typically, in the image restoration filter, a gain is determined depending on a distance from the optical center, and accordingly the center of the image after the image shift is performed is greatly displaced from the optical center and thus a correct gain cannot be applied if the image shift amount increases. Therefore, when the image shift amount is large, it is necessary to apply an appropriate image restoration filter to each parallax image.

Subsequently, at step S412, the controller 101 performs the optical correction processing (image restoration processing) on each of the parallax image A and the parallax image B. In other words, the controller 101 applies the first image restoration filter (i.e., performs filtering processing based on first data) on the parallax image A (first parallax image) to generate a first restored image. Furthermore, the controller 101 applies the second image restoration filter (i.e., performs filtering processing based on second data) on the parallax image B (second parallax image) to generate a second restored image.

Subsequently, at step S413, the controller 101 performs refocus processing on each of the restored image (first restored image) corresponding to the parallax image A where the image restoration processing has been performed and the restored image (second restored image) corresponding to the parallax image B where the image restoration processing has been performed. The refocus processing is processing (image synthesis processing) of synthesizing (combining) the first restored image with the second restored image (i.e., synthesizing the restored images corresponding to the respective parallax images) while shifting them by the image shift amount set at step S404 to generate a synthetic image (refocus image). In this embodiment, when the image shift amount is a positive value, the second restored image is shifted to the right with respect to the first restored image. On the other hand, when the image shift amount is a negative value, the second restored image is shifted to the left with respect to the first restored image.

As described above, in this embodiment, when the parameter (image shift amount, or value relating to a relative shift amount) is within the range of the threshold values, the image synthesis circuit 101a generates the synthetic image by using the parallax image A (first parallax image data) and the parallax image B (second parallax image data). Then, the image restoration circuit 101b applies the image restoration filter to the synthetic image to perform the image restoration processing. On the other hand, when the parameter (shift amount) is not within the threshold values, the image restoration circuit 101b applies the first image restoration filter to the first parallax image data to generate the first restored image and it applies the second image restoration filter to the second parallax image data to generate the second restored image. Then, the image synthesis circuit 101a synthesizes the first restored image with the second restored image to generate the synthetic image. In other words, when the shift amount exceeds the threshold value, the image restoration circuit 101b performs the filtering processing on the first image and the second image, and the image synthesis circuit 101a synthesizes the first and second images where the filtering processing has been performed. Accordingly, when the image shift amount is within the range of the threshold values, an amount of data of the image restoration filter and an amount of calculation of the image restoration processing (optical correction processing) can be reduced.

In this embodiment, the order of the parallax image processing (image synthesis processing) and the optical correction processing (image restoration processing) is determined according to the threshold values, but this embodiment is not limited thereto. The order can be also determined by considering a performance of a processing environment (performance of the image processing apparatus), an image processing mode, an intended use of an output image (image display state of the image processing apparatus), or the like. In other words, when a predetermined condition is satisfied, the image restoration circuit 101b performs the filtering processing on the image A (first image) and the image B (second image), and the image synthesis circuit 101a synthesizes the images A and B where the filtering processing has been performed. Preferably, when the predetermined condition is satisfied, the image restoration circuit 101b performs the filtering processing on the image A based on the first data, and it performs the filtering processing on the image B based on the second data different from the first data.

For example, when the PC of this embodiment has a performance (predetermined performance) where sufficiently-high speed processing can be performed (i.e., when the predetermined condition is satisfied), the optical correction processing can be performed before the parallax image processing is performed even if the image shift amount is within the range of the threshold values. When the image display application software of this embodiment has a high-speed processing mode and a high-quality image processing mode and the high-quality image processing mode that gives priority to image quality is set, the optical correction processing can be performed before the parallax image processing is performed even if the image shift amount is within the range of the threshold values. In this case, the predetermined condition includes a condition where a specific mode (high-quality image processing mode) that gives priority to high image quality relative to another mode is set. Each mode can be set by a mode setter (keyboard 109 or pointing device 111) of the image processing apparatus. When the image display state of the image display application software is a specific image display state such as a dot-by-dot display, a magnified display, a display in a specific targeted area, and the like, the optical correction processing can be performed before the parallax image processing is performed even if the image shift amount is within the range of the threshold values.

When the parameter set at step S406 in FIG. 4 is outside the range of the threshold values and the image restoration filter cannot be acquired for each parallax image at step S411, the same processing as that at step S207 of the first embodiment may be performed. In other words, in this case, the controller 101 may display a warning message on the display 110.

While this embodiment describes an example of the application software that operates on the personal computer (PC), the embodiment is not limited thereto. The CPU 11 provided in the image pickup apparatus 200 can perform the parallax image processing and the optical correction processing described above on the parallax image A and the parallax image B that are generated (acquired) by the image sensor 7.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment performs optical correction processing after performing image processing on a plurality of parallax images. According to each embodiment, an image processing apparatus, an image pickup apparatus, an image processing method, and a non-transitory computer-readable storage medium which are capable of reducing an amount of data of an image restoration filter relating to the plurality of parallax images and an amount of calculation of image restoration processing can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232703, filed on Nov. 30, 2015, and Japanese Patent Application No. 2016-202186, filed on Oct. 14, 2016, which are hereby incorporated by reference herein in their entirety.

What is claimed is:

1. An image processing apparatus comprising:
   a synthesizer that synthesizes a first image with a second image having a parallax relative to the first image to generate a synthetic image, the first image and the second image being based on outputs of a single image sensor; and
   a correction circuit that performs correcting processing of convolving a filter having reverse characteristics of an optical transfer function of an image pickup optical system that is used to generate the first image and the second image with respect to the synthetic image,
   wherein the synthesizer synthesizes the first image with the second image while a position of the second image is shifted relative to the first image, and
   wherein the correction circuit does not perform the correcting processing on the synthetic image, when a shift amount of the position of the second image relative to the first image is greater than a threshold value.

2. The image processing apparatus according to claim 1, wherein:
   the synthesizer separates the first image from a third image to generate the second image, and
   the first image and the third image are generated by a single image capturing operation of the image sensor.

3. The image processing apparatus according to claim 1, wherein the synthesizer synthesizes the first image with the second image while a position of the second image is shifted relative to the first image.

4. The image processing apparatus according to claim 1, wherein each of the first image, the second image, and the synthetic image is an image where signals corresponding to a plurality of spectral sensitivities are arranged in a predetermined pattern.

5. The image processing apparatus according to claim 1, wherein the correction circuit reads, from a memory, data indicating a coefficient of the filter or data for generating the coefficient to perform the correcting processing by using the data.

6. The image processing apparatus according to claim 1, wherein:
   the first image is an image based on electric charges accumulated in a first photoelectric converter of the image sensor,
   the second image is an image based on electric charges accumulated in a second photoelectric converter of the image sensor,
   the image sensor includes a plurality of pixels, each pixel including the first photoelectric converter and the second photoelectric converter, and
   light incident on the first photoelectric converter and light incident on the second photoelectric converter pass through different pupil regions of an exit pupil of the image pickup optical system.

7. An image processing apparatus comprising:
   a synthesizer that synthesizes a first image with a second image having a parallax relative to the first image to generate a synthetic image, the first image and the second image being based on outputs of a single image sensor; and
   a correction circuit that performs correcting processing of convolving a filter having reverse characteristics of an optical transfer function of an image pickup optical system that is used to generate the first image and the second image with respect to the synthetic image,
   wherein when a predetermined condition is satisfied, (1) the correction circuit performs the correcting processing on the first image based on a first filter and performs the correcting processing on the second image based on a second filter different from the first filter, and (2) the synthesizer synthesizes the first image with the second image where the correcting processing has been performed.

8. The image processing apparatus according to claim 7, wherein the predetermined condition includes a condition where a specific mode that gives priority to high image quality relative to another mode is set.

9. The image processing apparatus according to claim 7, wherein the predetermined condition includes a shift amount of the position of the second image relative to the first image being greater than a threshold value.

10. The image processing apparatus according to claim 9, wherein when the shift amount is less than or equal to the threshold value, (1) the synthesizer synthesizes the first image and the second image and (2) the correction circuit performs the correcting processing on the synthetic image.

11. An image pickup apparatus comprising:
    an image sensor including a plurality of pixels, each pixel including a first photoelectric converter and a second photoelectric converter;
    a synthesizer that synthesizes a first image with a second image having a parallax relative to the first image to generate a synthetic image, the first image and the second image being based on outputs of the image sensor; and
    a correction circuit that performs correcting processing of convolving a filter having reverse characteristics of an optical transfer function of an image pickup optical system that is used to generate the first image and the second image with respect to the synthetic image,
    wherein the synthesizer synthesizes the first image with the second image while a position of the second image is shifted relative to the first image, and
    wherein the correction circuit does not perform the correcting processing on the synthetic image, when a shift amount of the position of the second image relative to the first image is greater than a threshold value.

12. An image processing method comprising the steps of:
    synthesizing a first image with a second image having a parallax relative to the first image to generate a synthetic image, the first image and the second image being based on outputs of a single image sensor; and
    performing correcting processing of convolving a filter having reverse characteristics of an optical transfer function of an image pickup optical system that is used to generate the first image and the second image with respect to the synthetic image,
    wherein in the synthesizing step, the first image is synthesized with the second image while a position of the second image is shifted relative to the first image, and
    wherein the correcting processing on the synthetic image is not performed, when a shift amount of the position of the second image relative to the first image is greater than a threshold value.

13. A non-transitory computer-readable storage medium storing an image processing program which causes a computer to execute a process comprising the steps of:

synthesizing a first image with a second image having a parallax relative to the first image to generate a synthetic image, the first image and the second image being based on outputs of a single image sensor; and performing correcting processing of convolving a filter having reverse characteristics of an optical transfer function of an image pickup optical system that is used to generate the first image and the second image with respect to the synthetic image, wherein in the synthesizing step, the first image is synthesized with the second image while a position of the second image is shifted relative to the first image, and wherein the correcting processing on the synthetic image is not performed, when a shift amount of the position of the second image relative to the first image is greater than a threshold value.

14. An image pickup apparatus comprising:

an image sensor including a plurality of pixels, each pixel including a first photoelectric converter and a second photoelectric converter;

a synthesizer that synthesizes a first image with a second image having a parallax relative to the first image to generate a synthetic image, the first image and the second image being based on outputs of a single image sensor; and a correction circuit that performs correcting processing of convolving a filter having reverse characteristics of an optical transfer function of an image pickup optical system that is used to generate the first image and the second image with respect to the synthetic image, wherein when a predetermined condition is satisfied, (1) the correction circuit performs the correcting processing on the first image based on a first filter and performs the correcting processing on the second image based on a second filter different from the first filter, and (2) the synthesizer synthesizes the first image with the second image where the correcting processing has been performed.

15. An image processing method comprising the steps of:

synthesizing a first image with a second image having a parallax relative to the first image to generate a synthetic image, the first image and the second image being based on outputs of a single image sensor; and performing correcting processing of convolving a filter having reverse characteristics of an optical transfer function of an image pickup optical system that is used to generate the first image and the second image with respect to the synthetic image, wherein when a predetermined condition is satisfied, (1) the correcting processing is performed on the first image based on a first filter and the correcting processing is performed on the second image based on a second filter different from the first filter, and (2) the first image is synthesized with the second image where the correcting processing has been performed.

16. A non-transitory computer-readable storage medium storing an image processing program which causes a computer to execute a process comprising the steps of:

synthesizing a first image with a second image having a parallax relative to the first image to generate a synthetic image, the first image and the second image being based on outputs of a single image sensor; and performing correcting processing of convolving a filter having reverse characteristics of an optical transfer function of an image pickup optical system that is used to generate the first image and the second image with respect to the synthetic image, wherein when a predetermined condition is satisfied, (1) the correcting processing is performed on the first image based on a first filter and the correcting processing is performed on the second image based on a second filter different from the first filter, and (2) the first image is synthesized with the second image where the correcting processing has been performed.

* * * * *